United States Patent
Gabor (10) Patent No.: US 6,859,651 B2
(45) Date of Patent: Feb. 22, 2005

(54) METHOD AND SYSTEM FOR RE-AUTHENTICATION IN IP MULTIMEDIA CORE NETWORK SYSTEM (IMS)

(75) Inventor: Bajko Gabor, Budapest (HU)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/307,420

(22) Filed: Dec. 2, 2002

(65) Prior Publication Data

US 2003/0186681 A1 Oct. 2, 2003

Related U.S. Application Data (60) Provisional application No. 60/367,717, filed on Mar. 28, 2002.

(51) Int. Cl.[7] .................................................. H04Q 7/20
(52) U.S. Cl. ..................... 455/411; 455/410; 455/435.1
(58) Field of Search ................................. 455/411, 410, 455/418, 435; 370/328, 338; 380/247, 249, 250

(56) References Cited

U.S. PATENT DOCUMENTS 6,285,882 B1 * 9/2001 Cornillat et al. ......... 455/435.1

2002/0141358 A1 * 10/2002 Requena ..................... 370/329
2002/0147019 A1 * 10/2002 Uhlik et al. ................ 455/452
2003/0119506 A1 * 6/2003 Singhai et al. ............. 455/435

* cited by examiner

Primary Examiner—Erika A. Gary
(74) Attorney, Agent, or Firm—Antonelli, Terry, Stout & Kraus, LLP (57) ABSTRACT

A method and system for authentication of a mobile device that includes a mobile device and a network element in a communications network. The network element may be a call state control function. If the network element detects an incorrect event related to a mobile device, the network element shortens a registration validity time for the mobile device and sends the mobile device a notification to re-authenticate. The incorrect event can be, for example, an incorrect authentication response, an incorrect action by the mobile device, a session over a time maximum, traffic generated being over a maximum, or credit run out. The mobile device is de-registered if the mobile device fails to re-authenticate within the shortened registration validity time, and re-registered if the mobile device re-authenticates within the shortened registration validity time. The registration validity time for the mobile device is extended after re-registration.

55 Claims, 4 Drawing Sheets

METHOD AND SYSTEM FOR RE-AUTHENTICATION IN IP MULTIMEDIA CORE NETWORK SYSTEM (IMS)

This application claims the benefit of U.S. Provisional patent application Ser. No. 60/367,717, filed Mar. 28, 2002, the contents of which is herein incorporated by reference in its entirety.

BACKGROUND

1. Field of the Invention

The present invention relates to communications systems, and in particular, but not exclusively, to a communication system wherein a user is arranged to be registered and/or authenticated with the system.

2. Description of the Related Art

An exemplary IP communications network has been described in Release 5 of the specifications of the 3$^{rd}$ Generation Partnership Project (3GPP). Different technical specifications (available at the 3gpp.org website) address various respective aspects of the network.

3GPP Technical Specification 3G TS 24.229: "SIP Multimedia Call Control Protocol based on SIP and SDP" (TS 24.229 v2.0.0 (2002-02)), which is herein incorporated by reference in its entirety, addresses the call control protocol between a mobile device (i.e., user equipment (UE), subscriber, etc.) and various network elements such as a Serving Call State Control Function (S-CSCF), Proxy Call State Control Function (P-CSCF), and Interrogating Call State Control Function (I-CSCF). Chapter 5.4.1 of TS 24.229 addresses registration and authentication of a UE with a network element, such as a S-CSCF and indicates that if an authentication response from a UE during registration is incorrect, the network either: (1) attempts a further authentication challenge; or (2) deregisters the user and terminates any ongoing sessions for all public user identities associated with the private user identity being authenticated, and releases resources allocated to those sessions. TS 24.229 further specifies that, if the authentication response from the UE is incorrect for three consecutive attempts, then the S-CSCF deregisters the user and terminates any ongoing sessions for all public user identities associated with the private user identity being authenticated, and release resources allocated to those sessions.

A problem with this procedure is that, if a user's IP Multimedia Private Identity (IMPI) becomes known to another person, that other person (fake user) can send fake registration requests to the network which includes the user's IMPI. When the network sends an authentication challenge, the fake user will not generate correct authentication responses because the fake user does not have the necessary security (i.e., ISIM card) in the UE. Because of the incorrect authentication response, the network element may deregister the (genuine) user, dropping all of the ongoing calls of the genuine user. This oversight renders the network's subscribers susceptible to denial of service (DoS) attacks.

TS 33.203 v2.0.0 (2002-03), which is herein incorporated by reference in its entirety, addresses access security for IP-based services. TS 33.203 proposes that, even after unsuccessful re-registration, an IP Multimedia Core Network Subsystem (IMS) subscriber (i.e, mobile device) remains registered until the timer set for the next re-registration is expired. Before that, a registration flag is kept in the Home Subscriber Server (HSS) to the value registered even if the authentication was unsuccessful. The S-CSCF does not remove the data about a subscriber's registration and the P-CSCF shall keep the existing Security Association (SA).

The proposal in TS 33.203 is an attempted solution to the DoS problem in TS 24.229. However, this proposal is problematic in that even though a fake subscriber sends an invalid response to the network and the network loses its trust in the subscriber, the subscriber is still registered up until the time that its expiration timer expires.

SUMMARY OF THE INVENTION

A method and system for authentication of a mobile device that includes a mobile device and a network element in a communications network. The network element may be a call state control function. If the network element detects an incorrect event related to a mobile device, the network element shortens a registration validity time for the mobile device and sends the mobile device a notification to re-authenticate. The incorrect event can be, for example, an incorrect authentication response, an incorrect action by the mobile device, a session over a time maximum, traffic generated being over a maximum, or credit run out. The mobile device is de-registered if the mobile device fails to re-authenticate within the shortened registration validity time, and re-registered if the mobile device re-authenticates within the shortened registration validity time. The registration validity time for the mobile device is extended either back to an original value or to a new value after re-registration. The communications network may be an IP Multimedia Network (IMN).

BRIEF DESCRIPTION OF THE DRAWING

The present invention is further described in the detailed description which follows in reference to the noted plurality of drawings by way of non-limiting examples of embodiments of the present invention in which the like reference numerals represent similar parts throughout the several views of the drawings and wherein.

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phase "in one embodiment" in various places in the specification are not necessarily all referring to the same embodiment.

The present invention relates to user re-authentication in a communications network (such as the IP Multimedia Core Network Subsystem (IMS) of a communications network according to Release 5 of the 3GPP). During illustration of the present invention, the terms subscriber, user equipment (UE), and mobile device are used interchangeably and represent the same network device. Specifically, the present invention relates to re-authentication of a mobile device (subscriber) by a network element when an incorrect event has occurred related to the mobile device. The incorrect event detected by the network element may be any of a number of various occurrences. The incorrect event may be, for example, an incorrect authentication response, a session by the mobile device that has occurred over a time maximum, traffic generated by the mobile device being over a maximum, a credit run out, or any other incorrect, erroneous, or suspicious action by the mobile device. The incorrect authentication response may be due to an incorrect RES value received at the network node from the subscriber. Further, the mobile device may be any type of mobile device, such as for example, a mobile phone, personal digital assistant (PDA), etc.

Once an incorrect event related to a subscriber is detected by a network element, the network element shortens the registration time for the subscriber (i.e., mobile device) and notifies the subscriber that re-authentication must occur for re-registration, instead of dropping any ongoing call because of immediate termination of sessions according to TS 24.229. The shortened registration validity time is set to a value safe enough to allow the subscriber to be re-authenticated. If the subscriber successfully authenticates within the shortened registration validity time, the subscriber is re-registered and the registration validity time may be extended either back to its original period or to a new period. However, if authentication of the mobile device fails or does not occur before the expiration of the shortened registration validity time, the subscriber's subscription timer is made invalid and the subscriber is de-registered.

In an embodiment of the present invention, the network element may be a call state control function, and specifically a serving call state control function (S-CSCF). This applies to an example embodiment where the network is the IP Multimedia Core Network Subsystem (IMS). In this embodiment, the S-CSCF shortens the registration validity time from an original value to a smaller period of time and sends a notification to the subscriber. In this embodiment, the notification may contain information indicating that the registration period has been shortened and/or is a Notify request according to the Session Initiation Protocol (SIP).

The present invention may be implemented using currently existing network elements and user equipments. For example, the registration method and the duration of the registration period may be set by software in such elements and may be easily controlled according to the present invention by making modifications to the software. Moreover, the present invention is not limited in its application using a CSCF as the network element, or to the IMS. The present invention may be implemented using any other network elements (or multiple network elements) as well as any other type communications networks.

However, an example embodiment where the present invention is applied in an IMS along with the incorrect event being an incorrect authentication response will be used to help illustrate the present invention.

Figure 1:
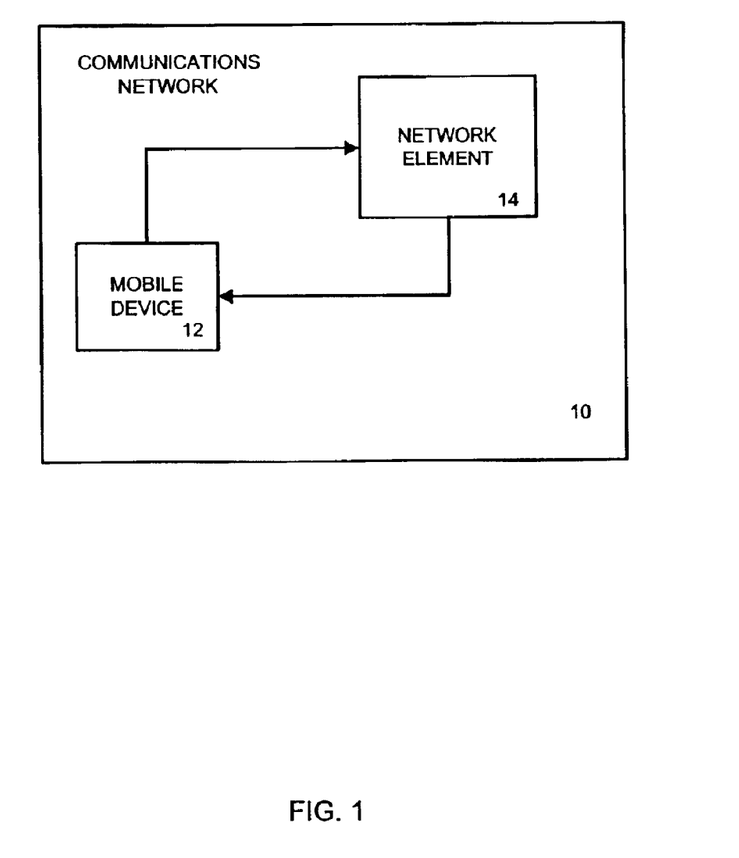
FIG. 1 is a system for re-authentication of a mobile device according to an example embodiment of the present invention.

FIG. 1 shows a system for re-authentication of a mobile device according to an example embodiment of the present invention. Mobile device 12 and network element 14 are part of a communications network 10. During normal operation, mobile device 12 sends a request for registration to network element 14 to register in the communication network 10. Upon receipt, network element 14 performs an authentication process with mobile device 12 before registering mobile device 12. Once mobile device 12 has been authenticated by network element 14, mobile device 12 is then registered in communication network 10.

If a fake user attempts to use the IP Multimedia Private Identity (IMPI) of mobile device 12 in an attempt to register with network element 14, network element 14 challenges this request by requesting that mobile device 12 re-authenticate with network element 14. After challenging the fake user's request for re-registration, the fake user may respond with an incorrect RES value. The network element 14 may then shorten the registration validity time for mobile device 12. However, preferably, enough time is left to allow mobile device 12 to be re-authenticated. The network element 14 may then generate a NOTIFY message towards mobile device 12 requesting that it re-authenticate. Since a fake user will not have the correct authentication responses, the fake user will not be authenticated and registered. However, mobile device 12 may submit appropriate authentication responses to network element 14 thereby causing network element 14 to re-register mobile device 12. Network element 14 may then extend the shortened registration validity time either back to the original time or to a new time for mobile device 12.

Figure 2:
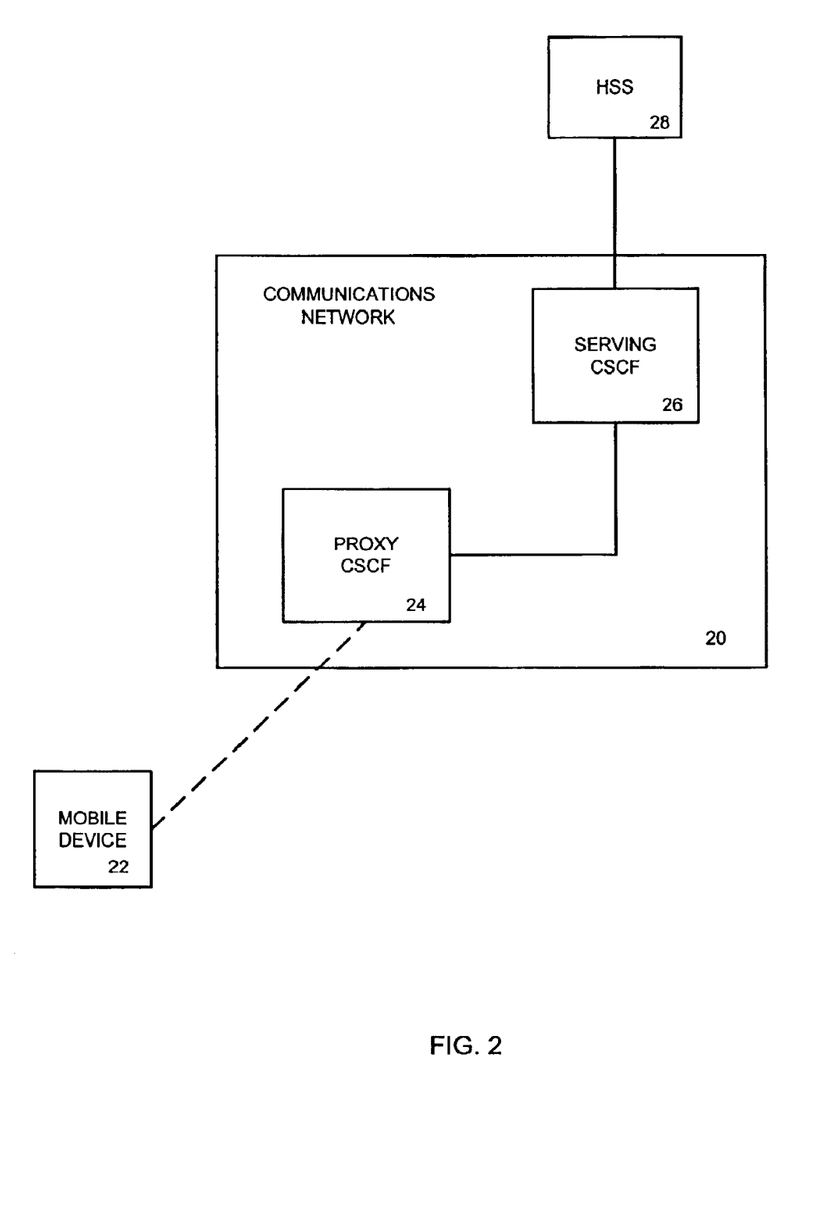
FIG. 2 is a diagram of a system for re-authentication of a mobile node according to another example embodiment of the present invention.

FIG. 2 shows a diagram of a system for re-authentication of a mobile node according to another example embodiment of the present invention. In this example embodiment, mobile device 22 interfaces with a proxy call state control function (P-CSCF) 24 that may interface with a serving call state control function (S-CSCF) 26. Mobile device 22, P-CSCF 24, and S-CSCF 26 may all be part of a communications network 20. The S-CSCF 26 may interface to a Home Subscriber Server (HSS) 28.

Proxy CSCF 24 may contain authentication information regarding mobile device 22 that may be used by serving CSCF 26 to determine whether mobile device 22 is to be registered. HSS 22 may also contain registration information regarding mobile device 22. In this example embodiment, when communications network 20 receives a new registration request from mobile device 22 (or what appears to be mobile device 22, e.g., a fake subscriber), the S-CSCF may issue an authentication challenge to the requesting mobile device. If incorrect responses are received, the S-CSCF may shorten the registration validity time of mobile device 22, allowing enough time for mobile device 22 to be re-authenticated, and generate a NOTIFY message towards mobile device 22 asking it to re-authenticate. If mobile device 22 fails to re-authenticate while its registration is still valid, mobile device 22 may be de-registered by serving CSCF 26. If mobile device 22 is authenticated within the shortened registration validity time, serving CSCF 26 then re-registers mobile device 22, and may extend the shortened registration validity time either back to the original value or to a new value of the registration validity time for mobile device 22.

Figure 3:
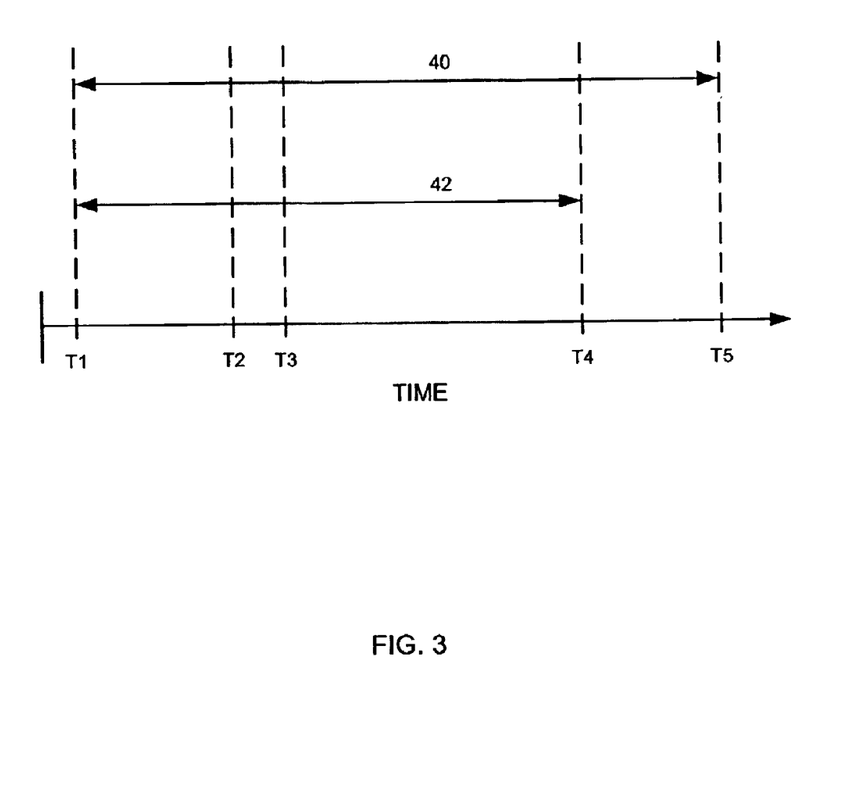
FIG. 3 is a diagram of registration validity times according to an example embodiment of the present invention.

FIG. 3 shows a diagram of registration validity times according to an example embodiment of the present invention. A subscriber may attempt and succeed in successful registration with a network element in a communications network at time T1. At this time, the network element (e.g., CSCF) may set a registration validity time period 40 that expires at time T5. This period may represent a period that the subscriber/mobile device has valid registration with the communications network. At some point during the registration validity period 40, re-registration may be attempted at time T2 with failed authentication (i.e., from a fake user). The network element may then at time T3 shorten the registration validity time period of the subscriber to a time period 42 that expires at time T4. During the period of time from T3 through time T4, the subscriber may be requested to re-authenticate in order to be registered in the network. If the subscriber fails to re-authenticate before the time period 42 expires at time T4, the subscriber may then be de-registered by the network element. If the subscriber successfully authenticates before time T4, the subscriber may be re-registered by the network element and the registration validity time extended back to time period 40 that expires at time T5 or beyond T5.

Figure 4:
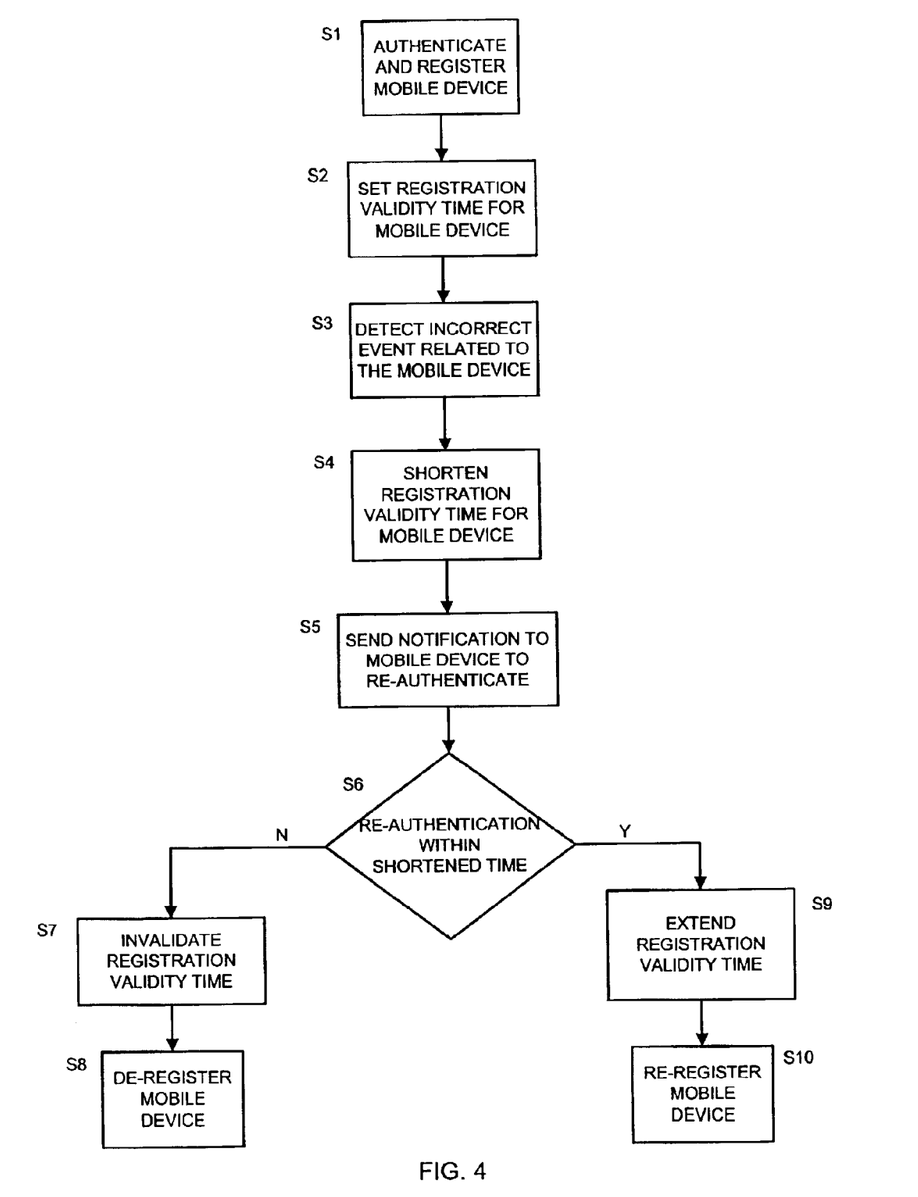
FIG. 4 is a flowchart of a process for authentication of a mobile device according to an example embodiment of the present invention.

FIG. 4 shows a flowchart of a process for authentication of a mobile device according to an example embodiment of the present invention. A mobile device may be authenticated and registered by a network element in a communication network S1. The network element may then set a registration validity time for the mobile device S2. The network element may detect an incorrect event related to the mobile device S3. The network element may then shorten the registration validity time for the mobile device S4 and send notification to the mobile device to re-authenticate S5. It may then be determined if the re-authentication information from the mobile device has been received within the shortened registration validity time S6, and if it has not, the registration validity time may be invalidated S7 and the mobile device de-registered S8 from the network. If the mobile device has been re-authenticated within the shortened time, the registration validity time may be extended S9 either back to the original value or to a new value, and the mobile device re-registered S10 in the communication network.

Method and system for authentication of a mobile device in a communication network are advantageous in that if a fake user attempts to register, the valid subscriber will not be de-registered and on-going sessions that it has going terminated. Further, even if it is determined that a fake user has tried to re-register, and the network loses trust in the fake user, the valid subscriber does not remain registered until its expiration timer expires unless the valid subscriber re-authenticates within a shortened expiration time and is re-registered in the network.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather the present invention extends to all functionally equivalent structures, methods and uses, such as are within the scope of the appended claims.

What is claimed is:

1. A method for re-authentication of a mobile device in a communications network comprising:
    detecting an incorrect event at a network element on the network after authentication/registration of a mobile device, the incorrect event being related to an occurrence by the mobile device;
    shortening a registration validity time for the mobile device in response to the occurrence by the mobile device; and
    sending the mobile device a notification to re-authenticate, the shortened registration validity time setting a time limit for the re-authentication.

2. The method according to claim 1, further comprising de-registering the mobile device if the mobile device fails to re-authenticate within the shortened registration validity time.

3. The method according to claim 1, wherein the notification contains information indicating that the mobile device has to perform re-authentication in order to remain registered.

4. The method according to claim 1, wherein the notification is a NOTIFY request according to a Session Initiation Protocol (SIP) protocol.

5. The method according to claim 1, wherein the communications network is an IP Multimedia Network (IMN).

6. The method according to claim 1, further comprising registering the mobile device if the mobile device re-authenticates within the shortened registration validity time.

7. The method according to claim 6, further comprising extending the shortened registration validity time either back to an original or to a new registration validity time if the mobile device re-authenticates within the shortened registration validity time.

8. The method according to claim 1, wherein the network element comprises a call state control function.

9. The method according to claim 8, wherein the network element comprises a serving call state control function (S-CSCF).

10. The method according to claim 1, wherein the incorrect event comprises an incorrect authentication response.

11. The method according to claim 10, wherein the incorrect authentication response comprises an incorrect RES value.

12. The method according to claim 1, wherein the incorrect event comprises an incorrect action by the mobile device.

13. The method according to claim 1, wherein the incorrect event comprises a session over a time maximum.

14. The method according to claim 1, wherein the incorrect event comprises traffic generated being over a maximum.

15. The method according to claim 1, wherein the incorrect event comprises credit run out.

16. The method according to claim 1, wherein the mobile device comprises one of a mobile phone and a Personal Digital Assistant (PDA).

17. A network element in a communications network, the network element performing a re-authentication process comprising:
   detecting an incorrect event at the network element after authentication/registration of a mobile device, the incorrect event being related to an occurrence by the mobile device;
   shortening a registration validity time for the mobile device in response to the occurrence by the mobile device; and
   sending the mobile device a notification to re-authenticate, the shortened registration validity time setting a time limit for the re-authentication.

18. The network element according to claim 17, the authentication process further comprising de-registering the mobile device if the mobile device fails to re-authenticate within the shortened registration validity time.

19. The network element according to claim 17, wherein the notification contains information indicating that the mobile device has to perform re-authentication in order to remain registered.

20. The network element according to claim 17, wherein the notification is a NOTIFY request according to a Session Initiation Protocol (SIP) protocol.

21. The network element according to claim 17, wherein the communications network is an IP Multimedia Network (IMN).

22. The network element according to claim 17, the authentication process further comprising registering the mobile device if the mobile device re-authenticates within the shortened registration validity time.

23. The network element according to claim 22, the authentication process further comprising extending the shortened registration validity time either back to an original or to a new registration validity time if the mobile device re-authenticates within the shortened registration validity time.

24. The network element according to claim 17, wherein the network element comprises a call state control function.

25. The network element according to claim 24, wherein the network element comprises a serving call state control function (S-CSCF).

26. The network element according to claim 17, wherein the incorrect event comprises an incorrect authentication response.

27. The network element according to claim 26, wherein the incorrect authentication response comprises an incorrect RES value.

28. The network element according to claim 17, wherein the incorrect event comprises an incorrect action by the mobile device.

29. The network element according to claim 17, wherein the incorrect event comprises a session over a time maximum.

30. The network element according to claim 17, wherein the incorrect event comprises traffic generated being over a maximum.

31. The network element according to claim 17, wherein the incorrect event comprises credit run out.

32. The network element according to claim 17, wherein the mobile device comprises one of a mobile phone and a Personal Digital Assistant (PDA).

33. A mobile device in a communications network, the mobile device performing a re-authentication process comprising:
   receiving a notification to re-authenticate from a network element on the network after authentication/registration of the mobile device, the notification being in response to detection by the network element of an occurrence by the mobile device; and
   re-authenticating with the network element within a shortened registration validity time set by the network element.

34. The mobile device according to claim 33, wherein the notification contains information indicating that the mobile device has to perform re-authentication in order to remain registered.

35. The mobile device according to claim 33, wherein the notification is a NOTIFY request according to a Session Initiation Protocol (SIP) protocol.

36. The mobile device according to claim 33, wherein the communications network is an IP Multimedia Network (IMN).

37. The mobile device according to claim 33, wherein the network element comprises a call state control function.

38. The mobile device according to claim 37, wherein the network element comprises a serving call state control function (S-CSCF).

39. The mobile device according to claim 33, wherein the mobile device comprises one of a mobile phone and a Personal Digital Assistant (PDA).

40. A system for re-authentication of a mobile device comprising:
   at least one mobile device, the at least one mobile device operatively connected to a communications network;
   a network element, the network element operatively connected to the communications network, the network element: detecting an incorrect event after authentication/registration of a mobile device related to an occurrence by the mobile device, shortening a registration validity time for the mobile device in response to the occurrence by the mobile device, and sending the mobile device a notification to re-authenticate, the shortened registration validity time setting a time limit for the re-authentication.

41. The system according to claim 40, the network element de-registering the mobile device if the mobile device fails to re-authenticate within the shortened registration validity time.

42. The system according to claim 40, wherein the notification contains information indicating that the mobile device has to perform re-authentication in order to remain registered.

43. The system according to claim 42, wherein the notification is a NOTIFY request according to a Session Initiation Protocol (SIP) protocol.

44. The system according to claim 40, wherein the communications network is an IP Multimedia Network (IMN).

45. The system according to claim 40, the network element registering the mobile device if the mobile device re-authenticates within the shortened registration validity time.

46. A system according to claim 45, the network element extending the shortened registration validity time either back to an original or to a new registration validity time if the mobile device re-authenticates within the shortened registration validity time.

47. The system according to claim 40, wherein the network element comprises a call state control function.

48. The system according to claim 47, wherein the network element comprises a serving call state control function (S-CSCF).

49. The system according to claim 40, wherein the incorrect event comprises an incorrect authentication response.

50. The system according to claim 49, wherein the incorrect authentication response comprises an incorrect RES value.

51. The system according to claim 40, wherein the incorrect event comprises an incorrect action by the mobile device.

52. The system according to claim 40, wherein the incorrect event comprises a session over a time maximum.

53. The system according to claim 40, wherein the incorrect event comprises traffic generated being over a maximum.

54. The system according to claim 40, wherein the incorrect event comprises credit run out.

55. The system according to claim 40, wherein the mobile device comprises one of a mobile phone and a Personal Digital Assistant (PDA).

* * * * *

UNITED STATES PATENT AND TRADEMARK OFFICE
CERTIFICATE OF CORRECTION

PATENT NO. : 6,859,651 B2
DATED : February 22, 2005
INVENTOR(S) : Bajko Gabor It is certified that error appears in the above-identified patent and that said Letters Patent is hereby corrected as shown below:

<u>Title page,</u>
Item [75], Inventor, delete "Bajko Gabor" and insert -- Gabor Bajko --.

Signed and Sealed this

Twenty-fourth Day of January, 2006

JON W. DUDAS
*Director of the United States Patent and Trademark Office*